(12) United States Patent
Deshpande et al.

(10) Patent No.: US 12,553,523 B2
(45) Date of Patent: Feb. 17, 2026

(54) THERMAL BREAK BETWEEN A SUBSTRATE PROCESSING CHAMBER AND SUBSTRATE HANDLING CHAMBER

(71) Applicant: ASM IP Holding B.V., Almere (NL)

(72) Inventors: Mandar Deshpande, Phoenix, AZ (US); Senthil Arasu Subas Chandra Bose, Chandler, AZ (US); Samer Banna, Phoenix, AZ (US)

(73) Assignee: ASM IP Holding B.V., Almere (NL)

( * ) Notice: Subject to any disclaimer, the term of this patent is extended or adjusted under 35 U.S.C. 154(b) by 72 days.

(21) Appl. No.: 18/745,241

(22) Filed: Jun. 17, 2024

(65) Prior Publication Data
US 2024/0426381 A1 Dec. 26, 2024

Related U.S. Application Data

(60) Provisional application No. 63/522,907, filed on Jun. 23, 2023.

(51) Int. Cl.
*F16K 3/02* (2006.01)
*F16K 51/02* (2006.01)

(52) U.S. Cl.
CPC .......... *F16K 3/0227* (2013.01); *F16K 51/02* (2013.01)

(58) Field of Classification Search
CPC ....... F16K 51/02; F16K 3/0227; F16K 27/044
See application file for complete search history.

(56) References Cited

U.S. PATENT DOCUMENTS

| | | |
|---|---|---|
| 4,098,490 A | 7/1978 | Morrison |
| 4,773,627 A | 9/1988 | King et al. |
| 5,013,009 A | 5/1991 | Nelson |
| 5,080,120 A | 1/1992 | Jordan |
| 5,082,247 A | 1/1992 | Owens et al. |
| 5,275,204 A | 1/1994 | Rogers et al. |
| 6,435,475 B1 | 8/2002 | Blume |
| 6,955,339 B1 | 10/2005 | Blume |
| 7,992,840 B2 | 8/2011 | Cain et al. |
| 8,720,197 B2 | 5/2014 | Persson et al. |
| 8,733,734 B2 | 5/2014 | Nakamura et al. |
| 8,888,106 B2 | 11/2014 | Hamade et al. |

(Continued)

FOREIGN PATENT DOCUMENTS

| | | |
|---|---|---|
| CA | 1103646 A | 6/1981 |
| CN | 203115232 U | 8/2013 |

(Continued)

*Primary Examiner* — Hailey K. Do
(74) *Attorney, Agent, or Firm* — Banner & Witcoff, Ltd.

(57) ABSTRACT

Thermal breaks and/or gaps between portions of interfacing surfaces of two chambers reduce heat transfer between the chambers. An interface surface (e.g., of a gate valve) includes (i) a base surface; (ii) a raised ring surface extending outward beyond the base surface, wherein the raised ring surface extends around a gate valve access opening; (iii) a seal support surface extending around the raised ring surface; and (iv) at least one raised boss surface extending outward beyond the base surface. The interface surface defines an outer perimeter having a total interface area. The raised ring surface and raised boss surface(s) define at least a portion of a total contacting surface area of the interface surface that is spaced outward from the base surface. The total contacting surface area of the interface surface is less than 10% of the total interface area and/or less than 10% of the base surface's surface area.

20 Claims, 8 Drawing Sheets

(56) References Cited

U.S. PATENT DOCUMENTS

Figure 1:
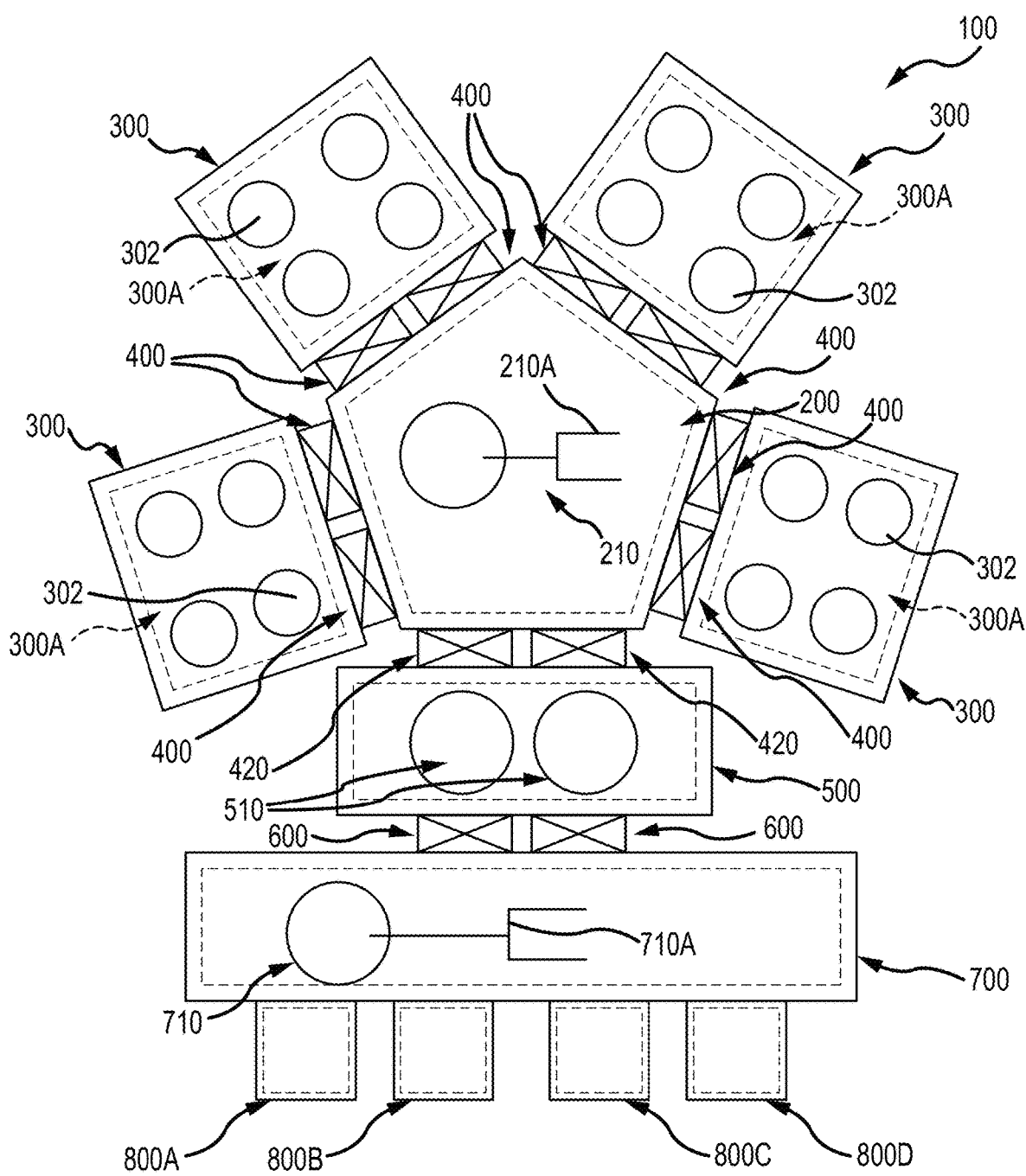

| | | |
|---|---|---|
| 9,103,457 B2 | 8/2015 | Holliday |
| 9,175,778 B2 | 11/2015 | Xu |
| 9,611,940 B2 | 4/2017 | Khan et al. |
| 9,719,169 B2 | 8/2017 | Mohn et al. |
| 10,948,083 B2 | 3/2021 | Nakano et al. |
| 10,969,021 B2 | 4/2021 | Nguyen et al. |
| 11,079,023 B2 | 8/2021 | Park |
| 11,384,843 B1 | 7/2022 | Kennedy |
| 11,549,331 B2 | 1/2023 | Herland |
| 11,898,653 B2 | 2/2024 | Kennedy |
| 11,946,138 B2 | 4/2024 | Lee et al. |
| 2003/0022633 A1 | 1/2003 | Chen |
| 2004/0089836 A1 | 5/2004 | Wu |
| 2005/0285071 A1 | 12/2005 | Williams et al. |
| 2006/0243941 A1 | 11/2006 | Hunter |
| 2010/0176327 A1 | 7/2010 | Hoang |
| 2010/0224816 A1 | 9/2010 | Ohlson et al. |
| 2012/0168662 A1 | 7/2012 | Borichevsky |
| 2013/0312832 A1 | 11/2013 | Avdjian et al. |
| 2016/0245420 A1 | 8/2016 | Cherewyk |
| 2016/0356386 A1 | 12/2016 | Parsons et al. |
| 2017/0146135 A1 | 5/2017 | Arora |
| 2017/0299067 A1 | 10/2017 | Nguyen et al. |
| 2017/0299068 A1 | 10/2017 | Nguyen et al. |
| 2020/0347942 A1 | 11/2020 | Krause et al. |
| 2022/0034408 A1 | 2/2022 | Kobayashi et al. |
| 2022/0099196 A1 | 3/2022 | Kennedy |
| 2023/0074251 A1 | 3/2023 | Dwairy et al. |

FOREIGN PATENT DOCUMENTS

| | | |
|---|---|---|
| CN | 210859968 U | 6/2020 |
| CN | 214466199 U | 10/2021 |
| CN | 112303265 B | 1/2022 |
| EP | 0454745 B1 | 9/1992 |
| EP | 3954930 B1 | 1/2024 |
| IN | 248465 B | 7/2011 |
| IN | 201717046152 A | 2/2018 |
| IN | 201731030551 A | 3/2019 |
| TW | M615265 U | 8/2021 |
| WO | 2023069863 A1 | 4/2023 |

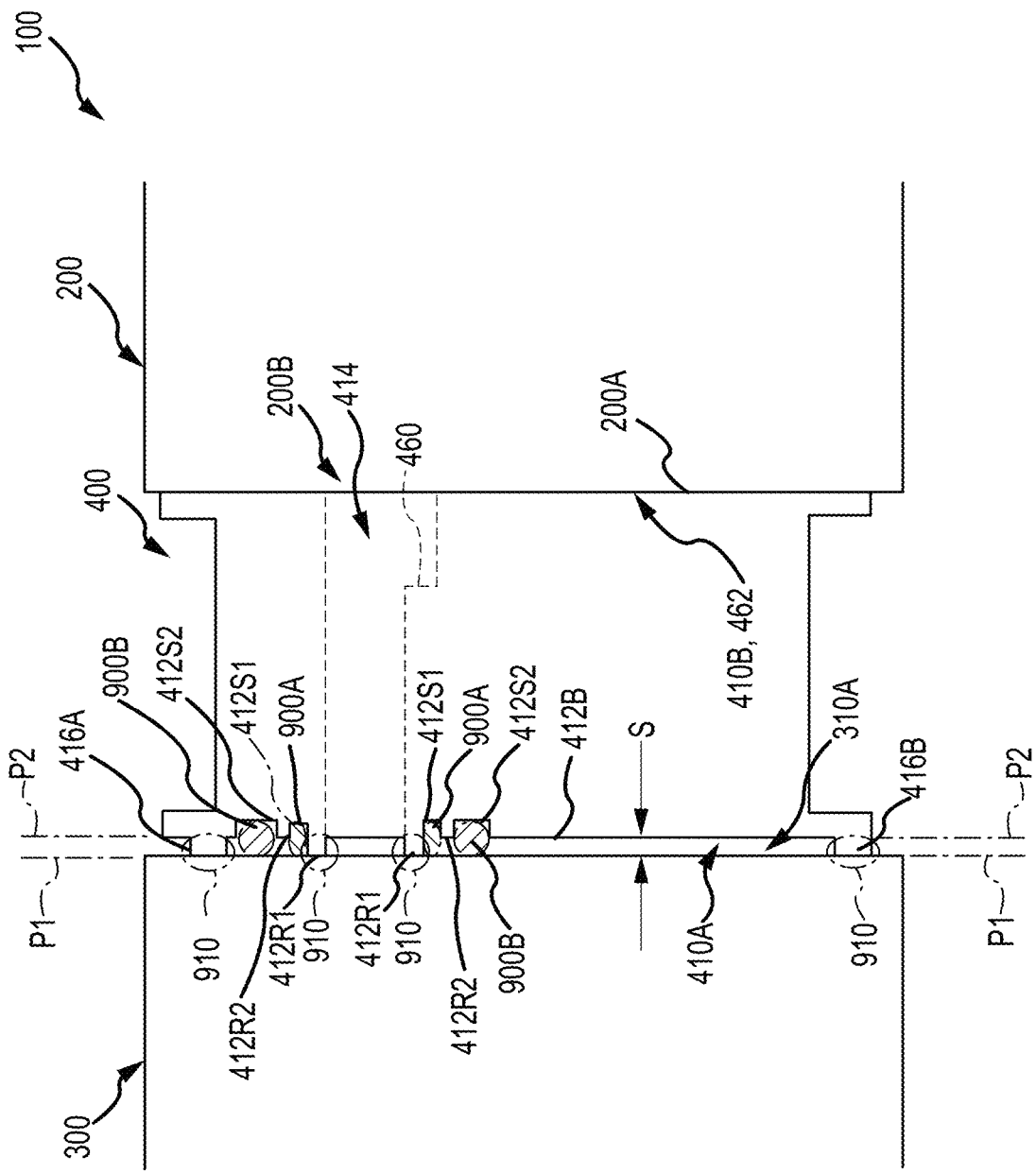

THERMAL BREAK BETWEEN A SUBSTRATE PROCESSING CHAMBER AND SUBSTRATE HANDLING CHAMBER

CROSS-REFERENCE TO RELATED APPLICATION(S)

This Application claims the benefit of U.S. Provisional Application 63/522,907 filed on Jun. 23, 2023, the entire contents of which are incorporated herein by reference.

FIELD OF THE DISCLOSURE

The present disclosure relates generally to structures and methods for reducing heat transfer between two chambers, e.g., a substrate processing chamber and a substrate handling chamber in a cluster type semiconductor vacuum processing tool. Some more particular aspects of this technology relate to gate valve interface surfaces at which a gate valve connects with a substrate processing chamber, gate valves including such gate valve interface surfaces, and substrate processing systems having a substrate processing chamber joined with a substrate handling chamber via a gate valve using such a gate valve interface surface.

BACKGROUND OF THE DISCLOSURE

Material layers are commonly deposited onto substrates during fabrication of semiconductor devices, such as during fabrication of integrated circuits and electronic devices. Material layer deposition is generally accomplished by supporting a substrate within a substrate processing chamber arrangement, heating the substrate to a desired deposition temperature, and flowing one or more material layer precursors through the chamber arrangement and across the substrate. As the precursor flows across the substrate, the material layer progressively develops onto the surface of the substrate, typically according to the temperature of the substrate and environmental conditions within the chamber arrangement.

In a cluster type semiconductor vacuum processing tool, multiple substrate processing chambers may be coupled with a single substrate handling chamber that moves substrates into and out of the substrate processing chambers and into and out of the overall substrate processing system. The multiple substrate processing chambers typically are rigidly attached to a substrate handling chamber through gate valves. The gate valves sealingly couple the substrate processing chambers with the substrate handling chamber and provide a window through which substrates can be transferred into and out of the substrate processing chamber. The connection between the gate valve and the substrate processing chamber typically comprises two rigid metal plates that include O-ring seals and bolting features.

Conventional semiconductor production systems and methods have generally been acceptable for their intended purpose, but there is room for improvement. For example, substantial manufacturing costs and processing time are involved in heating substrates for processing (e.g., layer deposition) and cooling the substrates and/or equipment after and during processing. Thus, reductions in these costs and/or processing time frames would be welcome advances in the art.

SUMMARY OF THE DISCLOSURE

Aspects of this technology relate to structures for reducing heat transfer between two chambers (e.g., between a substrate processing chamber and a gate valve, between a substrate processing chamber and a substrate handling chamber through a gate valve, etc.) This may be accomplished, in at least some examples of this technology, by providing a thermal break (or a gap) between at least some portions of interfacing surfaces connecting these chambers.

Gate valve interface surfaces in accordance with at least some examples of this technology may include an interface surface having: (a) a base surface; (b) a first raised ring surface extending outward beyond the base surface, wherein the first raised ring surface extends around a gate valve access opening; (c) a first seal support surface extending around the first raised ring surface; (d) a first raised boss surface extending outward beyond the base surface; and (e) a second raised boss surface extending outward beyond the base surface. The interface surface defines an outer perimeter and the outer perimeter defines a total interface area. The first raised ring surface, the first raised boss surface, and the second raised boss surface define at least a portion of an external component contact surface of the gate valve interface surface, wherein the external component contact surface is spaced outward from the base surface. The external component contact surface has a total contacting surface area that is less than 10% of the total interface area and/or a total contacting surface area that is less than 10% of a surface area of the base surface.

In addition to one or more of the features described above, or as an alternative, examples of gate valve interface surfaces in accordance with this technology may include a second raised ring surface at the interface surface extending around and defining an edge of the first seal support surface, wherein the first seal support surface extends between the first raised ring surface and the second raised ring surface.

In addition to one or more of the features described above, or as an alternative, examples of gate valve interface surfaces in accordance with this technology may include a second seal support surface at the interface surface extending around the second raised ring surface.

In addition to one or more of the features described above, or as an alternative, in some examples of gate valve interface surfaces in accordance with this technology, the base surface may define an edge of the second seal support surface.

In addition to one or more of the features described above, or as an alternative, examples of gate valve interface surfaces in accordance with this technology may include an outer perimeter edge, wherein the first raised boss surface and the second raised boss surface are located at or proximate the outer perimeter edge.

In addition to one or more of the features described above, or as an alternative, in some examples of gate valve interface surfaces in accordance with this technology, at least one of the first raised boss surface or the second raised boss surface may define an opening or recess configured to receive a connector for releasably connecting the interface surface with an external component.

In addition to one or more of the features described above, or as an alternative, in some examples of gate valve interface surfaces in accordance with this technology, the external component contact surface may define a first plane and the base surface may define a second plane that is spaced from the first plane.

Additional aspects of this technology relate to gate valves. Such gate valves may include: (a) a gate valve body defining a gate valve passage; (b) a valve component that is movable to open and close the gate valve passage; and (c) a first gate valve mounting face provided at a first side of the gate valve body. The first gate valve mounting face may include an interface surface having: (i) a base surface, (ii) a first raised ring surface extending outward beyond the base surface, wherein the first raised ring surface extends around the gate valve passage, (iii) a first seal support surface extending around the first raised ring surface, (iv) a first raised boss surface extending outward beyond the base surface, and (v) a second raised boss surface extending outward beyond the base surface. The interface surface defines an outer perimeter and the outer perimeter defines a total interface area. The first raised ring surface, the first raised boss surface, and the second raised boss surface define at least a portion of an external component contact surface of the interface surface, wherein the external component contact surface is spaced outward from the base surface. The external component contact surface has a total contacting surface area that is less than 10% of the total interface area and/or a total contacting surface area that is less than 10% of a surface area of the base surface.

In addition to one or more of the features described above, or as an alternative, examples of gate valves in accordance with this technology may include a second raised ring surface at the interface surface extending around and defining an edge of the first seal support surface, wherein the first seal support surface extends between the first raised ring surface and the second raised ring surface.

In addition to one or more of the features described above, or as an alternative, examples of gate valves in accordance with this technology may include a second seal support surface at the interface surface extending around the second raised ring surface.

In addition to one or more of the features described above, or as an alternative, in some examples of gate valves in accordance with this technology, the base surface may define an edge of the second seal support surface.

In addition to one or more of the features described above, or as an alternative, examples of gate valves in accordance with this technology may include a first seal in contact with the first seal support surface and/or a second seal in contact with the second seal support surface (e.g., when a second seal support surface is present).

Additional aspects of this technology relate to substrate processing systems that include: (a) a first chamber having a first mount surface; (b) a second chamber having a second mount surface; and (c) a gate valve having a first gate valve interface surface engaged with the first mount surface and a second gate valve interface surface engaged with the second mount surface, the gate valve further including a gate valve opening extending from the first gate valve interface surface to the second gate valve interface surface to allow substrates to move between the first chamber and the second chamber through the gate valve. The first gate valve interface surface includes: (i) a base surface, (ii) a first raised ring surface extending outward beyond the base surface, wherein the first raised ring surface extends around the gate valve opening, (iii) a first seal support surface extending around the first raised ring surface, (iv) a first raised boss surface extending outward beyond the base surface, and (v) a second raised boss surface extending outward beyond the base surface. The first gate valve interface surface defines an outer perimeter and the outer perimeter defines a total interface area. The first raised ring surface, the first raised boss surface, and the second raised boss surface contact the first mount surface and define at least a portion of an external component contact surface of the first gate valve interface surface, and the base surface is spaced from the first mount surface. The external component contact surface has a total contacting surface area that is less than 10% of the total interface area and/or a total contacting surface area that is less than 10% of a surface area of the base surface. A first seal is provided in contact with the first seal support surface and sealingly engages the gate valve with the first chamber (e.g., the first seal extends between the first seal support surface and the first mount surface to sealingly connect the gate valve with the first chamber).

In addition to one or more of the features described above, or as an alternative, in some examples of substrate processing systems in accordance with this technology, the first gate valve interface surface further may include a second raised ring surface extending around and defining an edge of the first seal support surface, wherein the first seal support surface extends between the first raised ring surface and the second raised ring surface.

In addition to one or more of the features described above, or as an alternative, in some examples of substrate processing systems in accordance with this technology, the first gate valve interface surface further may include a second seal support surface extending around the second raised ring surface.

In addition to one or more of the features described above, or as an alternative, in some examples of substrate processing systems in accordance with this technology, the base surface may define an edge of the second seal support surface.

In addition to one or more of the features described above, or as an alternative, substrate processing systems in accordance with some examples of this technology further may include a second seal in contact with the second seal support surface (e.g., sealingly engaging the gate valve with the first chamber (e.g., the second seal extends between the second seal support surface and the first mount surface to sealingly connect the gate valve with the first chamber)).

In addition to one or more of the features described above, or as an alternative, in some examples of substrate processing systems in accordance with this technology, the second raised ring surface may be spaced from the first mount surface.

In addition to one or more of the features described above, or as an alternative, substrate processing systems in accordance with some examples of this technology further may include a robotic arm in the second chamber, the robotic arm having a portion that extends through the gate valve opening to move substrates into and out of the first chamber through the gate valve.

This summary is provided to introduce a selection of concepts relating to this technology in a simplified form. These concepts are described in further detail in the detailed description of examples of the disclosure below. This summary is not intended to identify key features or essential features of the claimed subject matter, nor is it intended to be used to limit the scope of the claimed subject matter.

BRIEF DESCRIPTION OF THE DRAWING FIGURES

These and other features, aspects, and advantages of the invention disclosed herein are described below with reference to the drawings of certain embodiments, which are intended to illustrate and not to limit the invention.

FIG. 1 is a schematic view of a substrate processing system including a cluster type chamber arrangement in accordance with aspects of the present disclosure;

FIGS. 2A-2F provide various views of a gate valve, component parts thereof, and its engagement with other components in accordance with aspects of the present disclosure; and FIG. 3 schematically illustrates a substrate processing chamber and a substrate handling chamber coupled by a gate valve in accordance with aspects of the present disclosure.

It will be appreciated that elements in the figures are illustrated for simplicity and clarity and have not necessarily been drawn to scale. For example, the relative size of some of the elements in the figures may be exaggerated relative to other elements to help improve understanding of illustrated embodiments of the present disclosure.

DETAILED DESCRIPTION

Reference will now be made to the drawings wherein like reference numerals identify similar structural features or aspects of the subject disclosure.

FIG. 1 schematically illustrates an overhead view of a substrate processing system 100 in accordance with some examples of this technology (e.g., a "cluster type" semiconductor vacuum processing tool). This example substrate processing system 100 includes a five faceted substrate handling chamber 200 (although more or fewer facets could be provided in other examples of this technology). Four of those facets are connected to respective substrate processing chambers 300 via one or more gate valves 400. In this specifically illustrated example, each substrate processing chamber 300 is connected with the substrate handling chamber 200 by two gate valves 400, and each substrate processing chamber 300 is equipped to receive and process at least four substrates (note substrate supports 302). In other examples of this technology, however, each substrate processing chamber 300 may be connected with the substrate handling chamber 200 by four gate valves 400 (e.g., with two more gate valves 400 spaced vertically below the gate valves 400 shown in FIG. 1), and/or each substrate processing chamber 300 may be equipped to receive and process at least eight substrates (e.g., with four substrate supports 302 spaced vertically below the substrate supports 302 shown in FIG. 1). An individual substrate processing chamber 300 may include more or fewer substrate supports 302 and/or more or fewer gate valve ports and/or interfacing surfaces.

The substrate handling chamber 200 includes robotic arm 210 used to move substrates into and out of the various substrate processing chambers 300. In use, a gate valve 400 is opened, an end effector 210A of the robotic arm 210 extends through the open gate valve 400 to insert a substrate into or remove a substrate from an interior chamber 300A of the substrate processing chamber (e.g., placing a substrate on or taking a substrate off one of the substrate supports 302). Once the robotic arm 210 is retracted from the substrate processing chamber 300, the gate valve 400 is closed, thereby sealing the substrate processing chamber 300 from the gate valve 400. Then, any desired further action can take place in the substrate processing chamber 300 and/or the substrate handling chamber 200.

FIG. 1 further shows that this substrate processing system 100 includes a load lock module 500. The load lock module 500 is connected with the fifth facet of the substrate handling chamber 200 by one or more gate valves 420 (which may have the same structure or a different structure from the gate valves 400 connecting the substrate handling chamber 200 with the substrate processing chambers 300). Two gate valves 420 are shown in FIG. 1, although any desired number may be provided. The load lock module 500 includes one or more substrate holding components 510 (two shown in FIG. 1) for holding substrates on the way into the substrate handling chamber 200 for further processing and on the way out of the substrate handling chamber 200 (after processing is complete). The end effector 210A of robotic arm 210 moves through the gate valve(s) 420 (when opened) to move substrates into the substrate handling chamber 200 (for layer deposition and other processing) and out of the substrate handling chamber 200 (after processing is completed). The load lock module 500 (and gate valves 420) keep the substrates isolated from the environment of the substrate handling chamber 200 until the conditions (e.g., temperature, pressure, content of atmosphere, etc.) within the substrate handling chamber 200 are ready for the substrate(s) to be inserted.

The load lock module 500 further is coupled with an equipment front end module 700 via one or more additional gate valves 600. Gate valve(s) 600 may have the same structure or a different structure from the gate valves 400 and/or 420 described above. The equipment front end module 700 of this example includes a robotic arm 710. The end effector 710A of that robotic arm 710 moves through the gate valve(s) 600 (when opened) to move substrates into the load lock module 500 (for layer deposition and other processing) and out of the load lock module 500 (after processing is completed). The robotic arm 710 of the equipment front end module 700 also picks up new substrates for processing from one of the load ports 800A-800D and returns processed substrates to one of the load ports 800A-800D, e.g., to be transported to another location for further processing.

Thus, in the substrate processing system 100 of FIG. 1 (e.g., a cluster type semiconductor vacuum processing tool), multiple substrate processing chambers 300 are coupled with a single substrate handling chamber 200 that moves substrates into and out of the individual substrate processing chambers 300 and into and out of the overall substrate processing system 100 (with the additional aid of load lock module 500, equipment front end module 700, and load port(s) 800A-800D). The multiple substrate processing chambers 300 are rigidly attached to substrate handling chamber 200 through gate valves 400. The gate valves 400 sealingly couple the substrate processing chambers 300 with the substrate handling chamber 200 and provide a window that may be selectively opened and closed (and sealed) and through which substrates can be transferred into and out of a substrate processing chamber 300.

As noted above, the connection between a conventional gate valve and its associated substrate processing chamber typically comprises two rigid metal plates that include O-ring seals and bolting features. These conventional connections, however, have some disadvantages. Typically, to perform the desired depositions, a substrate processing chamber (e.g., like chambers 300) may be at a relatively high temperature (e.g., 900C or even higher). The substrate handling chamber (e.g., like chamber 200), on the other hand, need not be maintained at such high temperatures. Indeed, in use, a typical substrate handling chamber 200 may be 200 C to 300 C degrees cooler than the substrate processing chamber(s) 300 to which it is connected. Thus, the large mass of the substrate handling chamber 200 that is directly coupled to the substrate processing chamber(s) (300) can lead to thermal non-uniformity in the chambers due to heat transfer. More specifically, undesired heat loss from the substrate processing chamber 300 through its conventional interface with a gate valve may increase manufacturing costs due to the need to further heat the substrate processing chamber 300. Further, heat transfer to the substrate handling chamber 200 through a conventional gate valve can cause that chamber 200 (including the substrate handling chamber 200's robotic arm 210 contained therein) to act as a heat sink. Thus, it may be necessary to circulate cooling water within the substrate handling chamber 200 (and particularly in a manner to cool the substrate handling chamber 200's robotic arm 210) to maintain the substrate handling chamber 200 and its equipment at a desired temperature level. This need for additional cooling increases equipment and manufacturing costs and may cause processing delays (as the overall substrate processing system 100 may need to wait for the substrate handling chamber 200 to reach a desired cooled temperature).

Aspects of this technology address at least some of these issues by providing structures for reducing heat transfer from a substrate processing chamber 300 to a substrate handling chamber 200 through the gate valves 400 connecting these chambers. This is accomplished, in at least some examples of this technology, by providing a thermal break (or a gap) between at least some portions of interfacing surfaces of the substrate processing chamber 300 and a gate valve 400 connected to it.

Figure 2A:
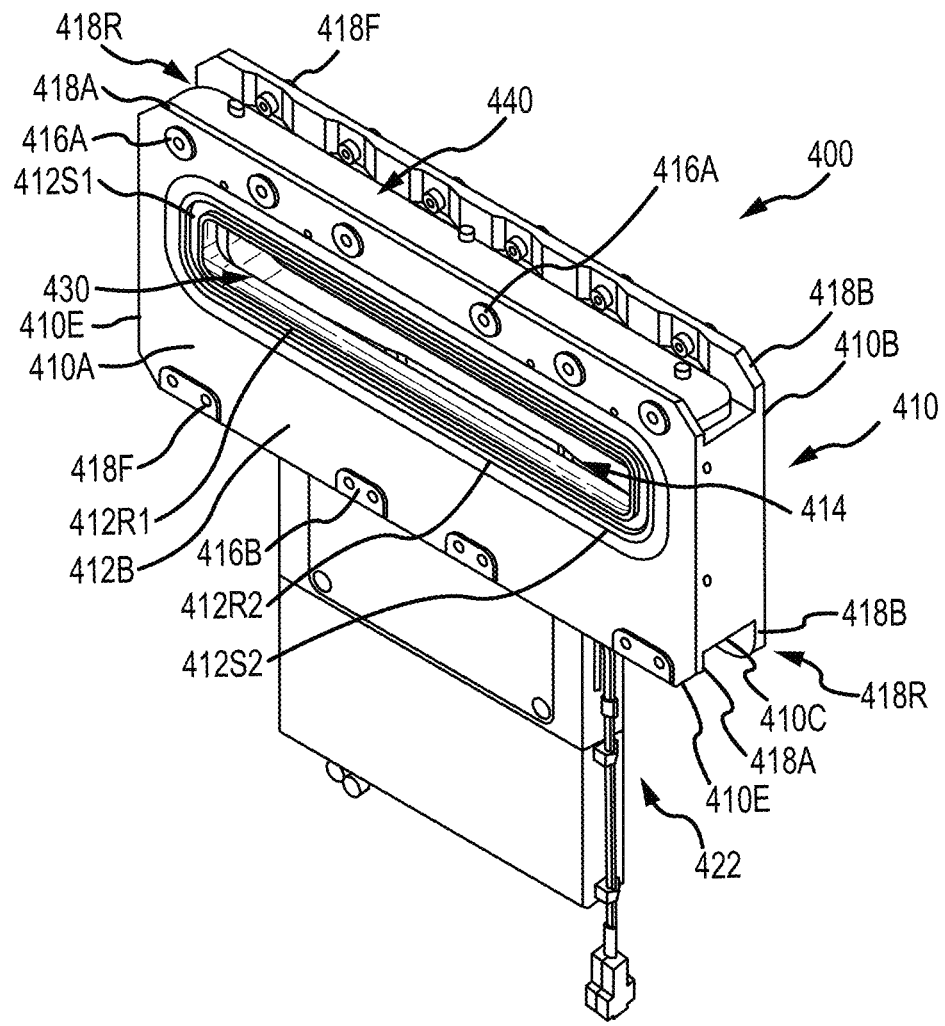
Figure 2B:
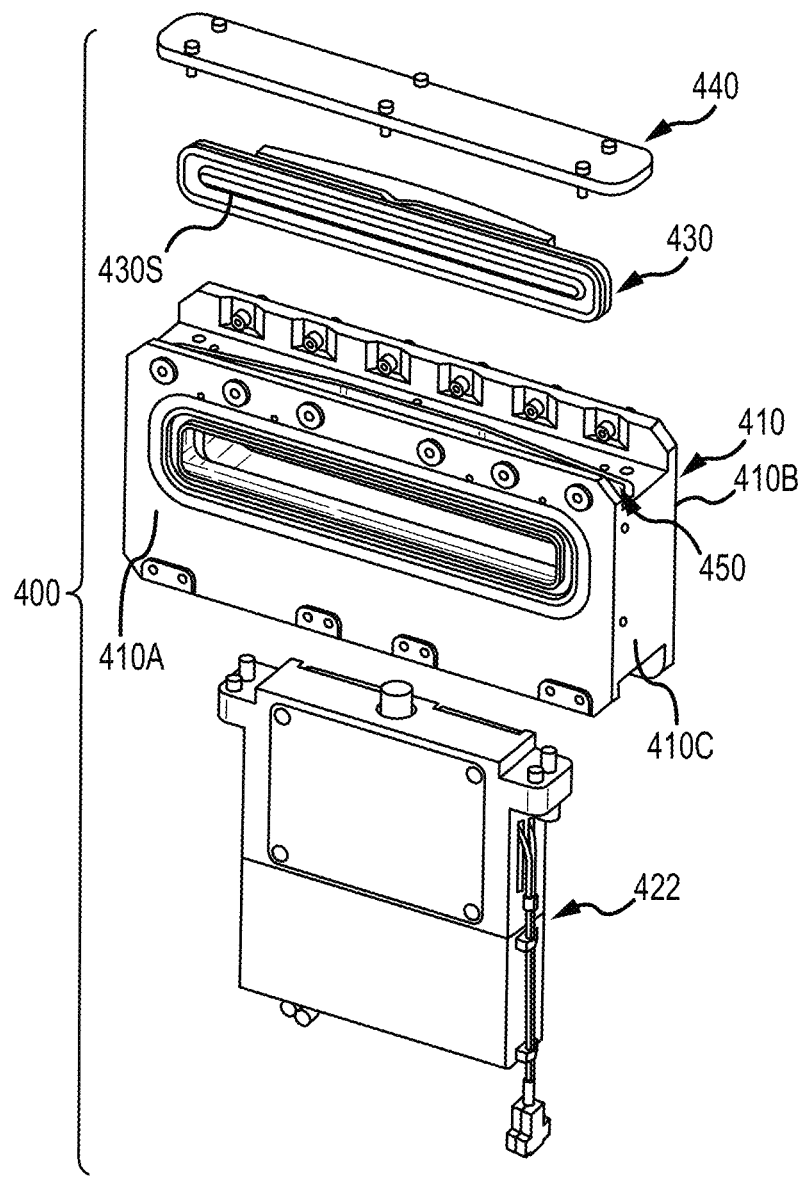

FIGS. 2A-3 provide various views of a gate valve 400 in accordance with some examples and aspects of this technology. FIGS. 2A and 2B provide perspective and exploded views of the gate valve 400; FIG. 2C shows a gate valve interface surface 410A for engaging a mount surface of a substrate processing chamber 300; FIG. 2D shows a gate valve interface surface 410B for engaging a mount surface of a substrate handling chamber 200; FIG. 2E provides an enlarged view showing features of the gate valve interface surface 410A; and FIG. 2F provides a partial sectional view of the gate valve 400. FIG. 3 schematically illustrates a side view of the gate valve 400 connecting a substrate processing chamber 300 with a substrate handling chamber 200.

As shown in these figures, this example gate valve 400 includes: (a) a gate valve body 410; (b) a valve actuator 422 (also called a "valve component" that is movable to open and close the gate valve passage (the gate valve access opening 414 through which a robotic arm 210 end effector 210A carrying a substrate can pass); (c) a seal plate 430; and (d) a seal plate cover 440. The seal plate 430 fits within the interior of the gate valve body 410, is engaged with the valve actuator 422, and may be positioned so that its slot 430S is located within the gate valve access opening 414 during substrate transfer. Seal plate cover 440 is connected with the gate valve body 410 (e.g., by bolts or other fasteners) to close opening 450.

Gate valve body 410 of this example includes (i) a first gate valve interface surface 410A (also called a "gate valve mounting face" herein) for engaging a gate valve mount surface 310A of a substrate processing chamber 300 (see FIG. 3); (ii) a second gate valve interface surface 410B (also called a "gate valve mounting face" herein) for engaging a gate valve mount surface 200A of a substrate handling chamber 200 (see FIG. 3); and (iii) a main body portion 410C located between (and connecting) the first gate valve interface surface 410A and the second gate valve interface surface 410B. The main body portion 410C includes openings and recesses for accommodating the valve actuator 422 and seal plate 430 in the manner shown in FIG. 2A. The gate valve body 410 may be made from one or more component parts (e.g., the first gate valve interface surface 410A, the second gate valve interface surface 410B, and the main body portion 410C may be separate parts that are joined together (e.g., by welding, by fasteners, etc.) or any two or more of these parts may be formed as a single part). Gate valve bodies 410 of this type, including the gate valve interface surfaces 410A and 410B, may be made from aluminum, aluminum alloys, or other metal materials.

The gate valve interface surface 410A according to some examples of this technology now will be described in more detail. Gate valve interface surface 410A constitutes a surface at which gate valve 400 is connected with substrate processing chamber 300 (see also FIG. 3). This example gate valve interface surface 410A includes: (i) a base surface 412B (which forms at least 50% of the surface area of the gate valve interface surface 410A, and in some examples, at least 75% of the surface area of the gate valve interface surface 410A); (ii) a first raised ring surface 412R1 extending outward beyond the base surface 412B, wherein the first raised ring surface 412R1 extends around (and defines) a gate valve access opening 414; and (iii) a first seal support surface 412S1 extending around the first raised ring surface 412R1. The first seal support surface 412S1 receives a portion of a first seal 900A, e.g., as shown in FIG. 3 (an O-ring). The first seal support surface 412S1 may be recessed as compared with the base surface 412B or coplanar with base surface 412B.

The gate valve interface surface 410A of this example further includes one or more raised boss surfaces that extend outward beyond the base surface 412B. In this specific illustrated example, the gate valve interface surface 410A includes a first set of raised boss surfaces 416A spaced apart along one edge of the gate valve interface surface 410A (e.g., spaced apart along and/or in a direction parallel to an elongated edge of access opening 414) and a second set of raised boss surfaces 416B spaced apart along an opposite edge of the gate valve interface surface 410A (e.g., spaced apart along and/or in a direction parallel to an elongated edge of access opening 414). The raised boss surfaces 416A and/or 416B may be integrally formed with the base surface 412B, e.g., by machining a starting surface (e.g., formed from aluminum or aluminum alloy) to form base surface 412B as a recessed surface (e.g., a planar surface) and leaving the desired raised boss surfaces 416A, 416B (which also may be planar and coplanar) extending outward from base surface 412B.

Additionally or alternatively, if desired, one or more of the raised boss surfaces 416A and/or 416B may be formed from a different material, such as a lower thermal conductivity metal (such as stainless steel, nickel alloys (such as those available under the Hastelloy® or Inconel® brands), etc.) to further reduce the net thermal conductivity for the raised boss surface(s) 416A and/or 416B.

One or more of the raised boss surfaces 416A and/or 416B may include openings or recesses, e.g., to accommodate a bolt or other connector for releasably engaging the gate valve interface surface 410A (and thus the gate valve 400) with a gate valve mount surface 310A of the substrate processing chamber 300 (or with another external component). In the specifically illustrated examples: (i) each of raised boss surfaces 416A (e.g., along one perimeter edge 410E of the gate valve interface surface 410A) is generally round in shape and has one through hole opening extending through it, and (ii) each of boss surfaces 416B (e.g., along another perimeter edge 410E of the gate valve interface surface 410A) is generally rectangular in shape (shown in rounded corners) and has two through hole openings extending through it. Additionally or alternatively, as shown in FIG. 2A: (i) the top perimeter edge 410E has six raised boss surfaces 416A (each with one through hole opening) and (ii) the bottom perimeter edge 410E has four raised boss surfaces 416B (each with two through hole openings). Other combinations of boss surface sizes, shapes, locations, and/or arrangements of through hole openings may be used in other specific examples of this technology. For example, in some arrangements, four bolt receiving openings and/or four raised boss surfaces 416A and/or 416B may be sufficient along the top and/or bottom perimeter edges 410E.

In this illustrated example, an outer perimeter edge 410E extends completely around the gate valve interface surface 410A. In at least some examples of this technology, one or more of the raised boss surfaces 416A and/or 416B will be located at or proximate to the outer perimeter edge 410E. A raised boss surface 416A, 416B is considered located "proximate to" the outer perimeter edge 410E if at least some portion of the raised boss surface is located within 25 mm of the outer perimeter edge 410E. In some examples, at least some portion of the raised boss surfaces 416A and/or 416B will come within 20 mm, within 16 mm, within 12 mm, within 8 mm, or even to the outer perimeter edge 410E of the gate valve interface surface 410A. The outer perimeter edge 410E also encloses a "total interface area" S2, which is discussed in more detail below.

Figure 2C:
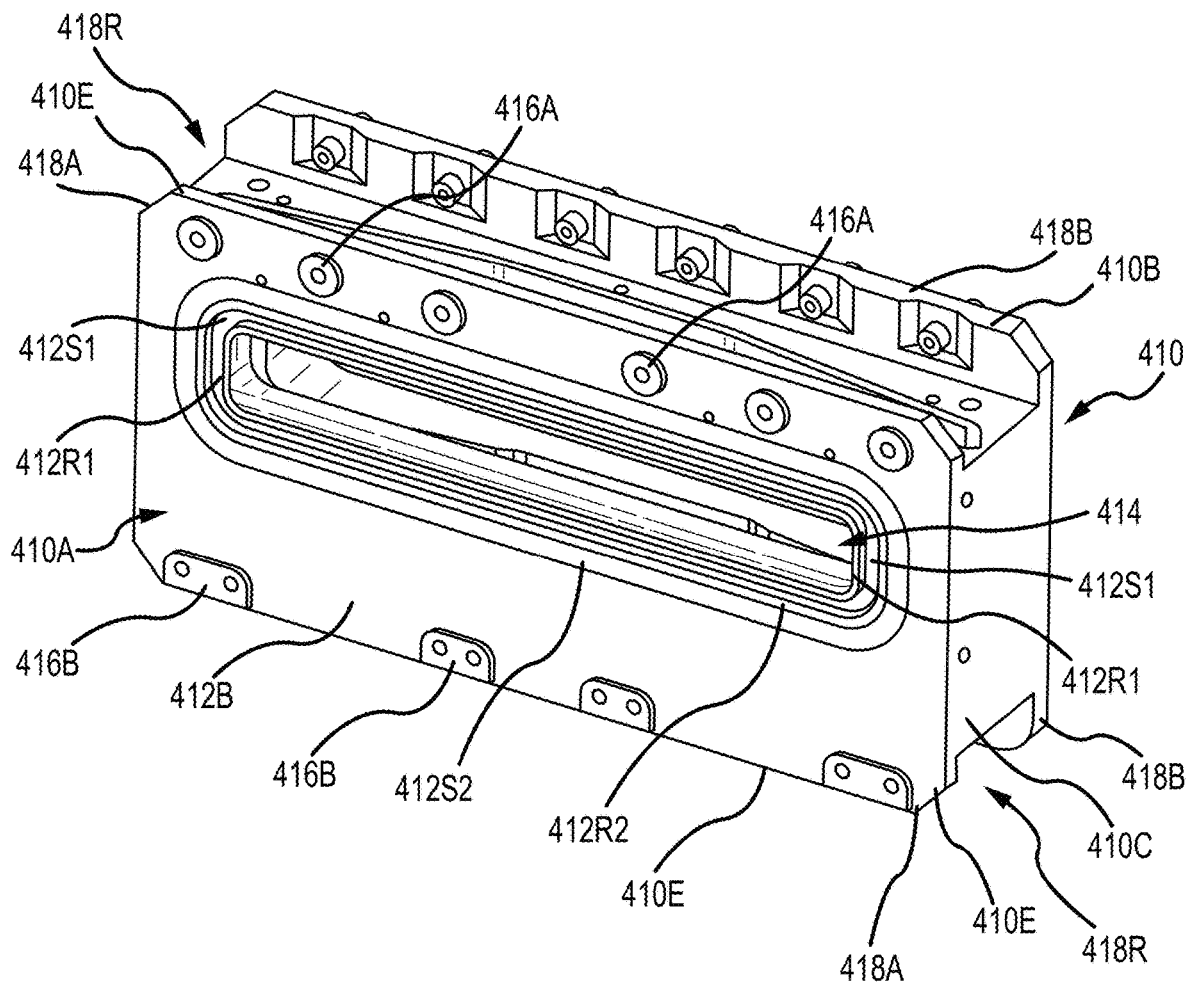
Figure 2D:
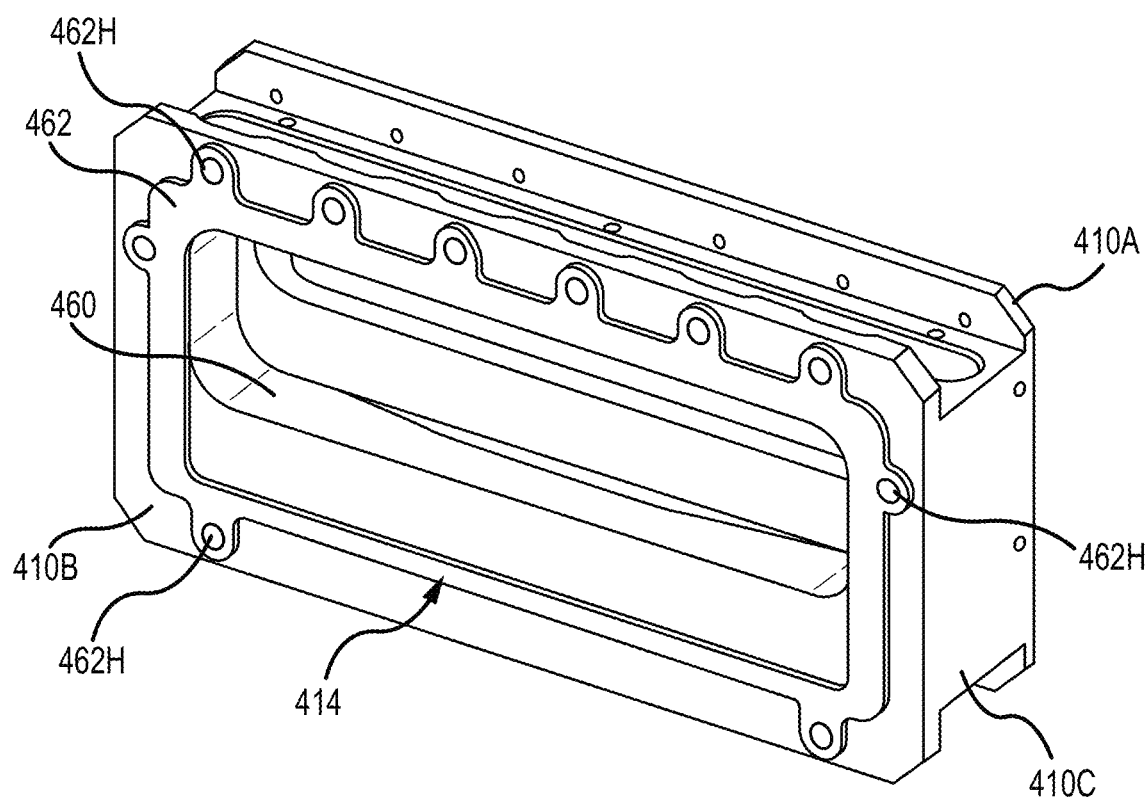
Figure 2E:
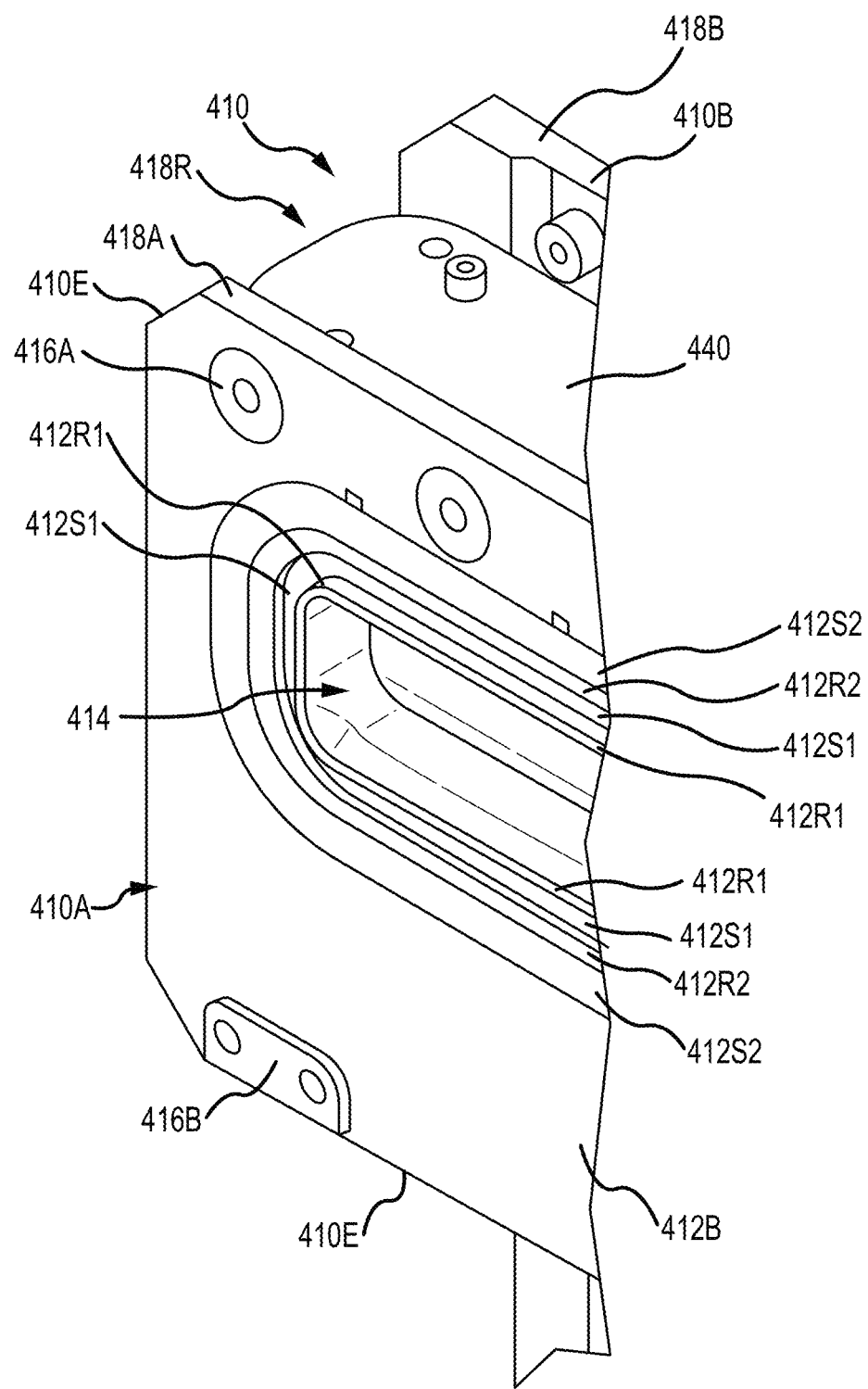
Figure 2F:
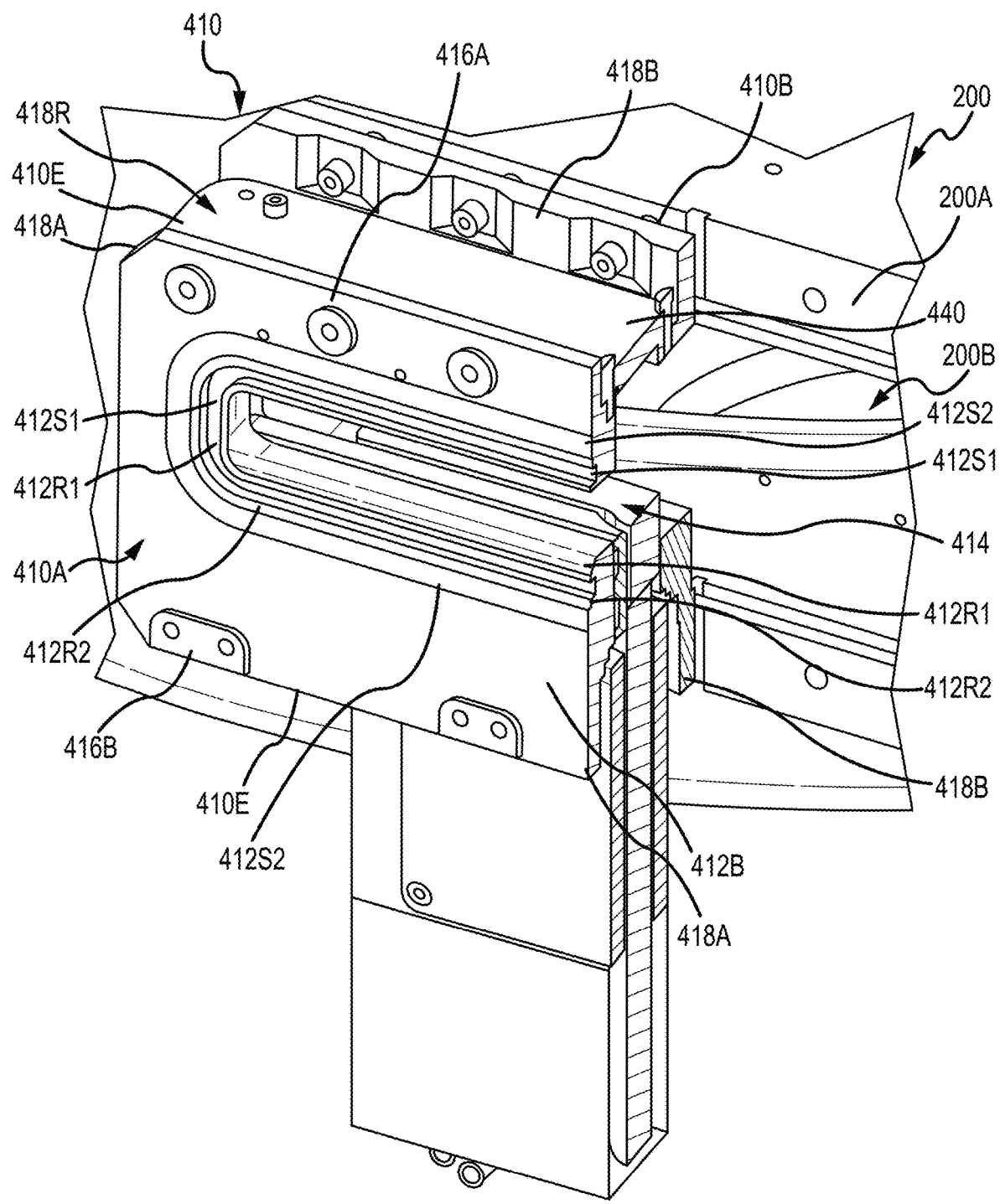

As further shown in FIGS. 2C, 2E, and 3, in at least some examples of this technology, the gate valve interface surface 410A further may include a second raised ring surface 412R2 that extends around and defines an outer edge of the first seal support surface 412S1. Thus, in this illustrated example, the first seal support surface 412S1 extends between the first raised ring surface 412R1 and the second raised ring surface 412R2. A second seal support surface 412S2 may be provided, e.g., extending around the second raised ring surface 412R2. The base surface 412B in this illustrated example defines an outer edge of the second seal support surface 412S2. The second seal support surface 412S2 is recessed from and extends between the base surface 412B and the outer edge of the second raised ring surface 412R2. In some examples of this technology, the second seal support surface 412S2 will receive a portion of a second seal 900B, e.g., as shown in FIG. 3 (an O-ring). The second seal support surface 412S2 may be recessed as compared with the base surface 412B.

Alternatively, in some examples of this technology, the second raised ring surface 412R2 and/or the second seal support surface 412S2 may be omitted. In such structures, the base surface 412B may extend to and define the outer edge of first seal support surface 412S1.

Aspects of this technology relate to reducing the direct metal-to-metal contact surface area between the facing surfaces of the gate valve 400 and the substrate processing chamber 300. This reduction in the direct metal-to-metal contact area will reduce heat transfer between the substrate processing chamber 300 and the substrate handling chamber 200 through the gate valve 400. Sufficient direct contact surface area is needed to maintain the sealed connection between the substrate processing chamber 300 and the gate valve 400, but too much direct contact surface area results in excessive heat transfer from the substrate processing chamber 300 to the gate valve 400 (and then to the substrate handling chamber 200). Thus, in accordance with aspects of this technology, the first raised ring surface 412R1 and the raised boss surface(s) 416A and/or 416B will define at least a portion of an external component contact surface of the gate valve interface surface 410A. The term "external component contact surface" as used herein means the surface(s) that directly contact another component (e.g., direct metal-to-metal contact). The direct metal-to-metal contacting surface locations between the gate valve interface surface 410A and the gate valve mount surface 310A of the substrate processing chamber 300 are highlighted in FIG. 3 by broken line circles 910. These external component contact surface locations are spaced outward from the base surface 412B of the gate valve interface surface 410A such that the base surface 412B will be spaced apart from the gate valve mount surface 310A of the substrate processing chamber 300. FIG. 3 illustrates this spacing distance as dimension S (not shown to scale in FIG. 3). The spacing dimension S may be at least 0.05 mm (and in some examples, at least 0.1 mm, or even at least 0.125 mm) and less than 10 mm (and in some examples, less than 8 mm, less than 6, less than 4 mm, or even less than 3 mm). The spacing dimension S may be constant or varied over the overall surface area of the base surface 412B of the gate valve interface surface 410A.

While not shown in the example of FIGS. 2A-3, in some examples of this technology, the second raised ring surface 412R2 may directly contact the gate valve mount surface 310A of a substrate processing chamber 300. But, in the specific example of FIGS. 2A-3, the second raised ring surface 412R2 is spaced from the gate valve mount surface 310A of substrate processing chamber 300 (e.g., by dimension S or by another distance).

As described above, only some portions of the gate valve interface surface 410A directly contact the gate valve mount surface 310A of the substrate processing chamber 300. These directly contacting portions (i.e., the first raised ring surface 412R1 and the raised boss surface(s) 416A and/or 416B in this illustrated example) may define and lie on a first plane P1 (see FIG. 3). The base surface 412B of the gate valve interface surface 410A is recessed from that first plane P1 (by dimension S). In some examples, the base surface 412B may lie on second plane P2 that is spaced from the first plane (see FIG. 3), e.g., by dimension S. In this manner, at least 50% of the gate valve interface surface 410A (at least the base surface 412B) will be spaced apart from (and not in direct contact with) the gate valve mount surface 310A of the substrate processing chamber 300. The second raised ring surface 412R2, when present, may lie on second plane P2 (and thus be co-planar with the base surface 412B), or it may have a different spacing than that of base surface 412B. In some examples of this technology, at least 80% of the surface of the gate valve interface surface 410A (excluding any through holes, such as gate valve access opening 414) will lie within 10 mm of a plane placed on the outermost surfaces of the gate valve interface surface 410A (e.g., within 10 mm of the plane P1 shown in FIG. 3). At least 85%, at least 90%, at least 95%, or even 100% of the surface of the gate valve interface surface 410A (excluding any through holes, such as gate valve access opening 414) will lie within 10 mm of plane P1. Thus, gate valve interface surface 410A is closely coupled to the gate valve mount surface 310A when gate valve 400 in connected with substrate processing chamber 300.

The extent of direct contact (metal-to-metal contact) between the gate valve interface surface 410A and the gate valve mount surface 310A will be kept low in accordance with aspects of this technology. The total contact surface area (direct metal-to-metal contact) between the gate valve interface surface 410A and the gate valve mount surface 310A will be defined herein as total contacting surface area S1. In at least some examples of this technology, the total contacting surface area S1 between the gate valve interface surface 410A and the gate valve mount surface 310A will be the combined surface areas of: (a) the first raised ring surface 412R1 and (b) the raised boss surface(s) 416A and/or 416B that come into direct contact with gate valve mount surface 310A when the gate valve 400 is connected with the substrate processing chamber 300. In at least some examples of this technology, the entire direct metal-to-metal total contacting surface area S1 between the facing surfaces of the gate valve 400 and the substrate processing chamber 300 (i.e., between gate valve interface surface 410A and gate valve mount surface 310A) will consist of (or consist essentially of): (i) the first raised ring surface 412R1 and (ii) the raised boss surface(s) 416A and/or 416B.

Further, in at least some examples of this technology, the total contacting surface area S1 will be less than 10% of the total surface area of the base surface 412B. In such structures, the surface area of the base surface 412B includes all surface area of the gate valve interface surface 410A that will not directly contact the gate valve mount surface 310A of the substrate processing chamber 300 other than the first seal support surface 412S1 and, if present, the second raised ring surface 412R2 and/or the second seal support surface 412S2. In some structures, the total contacting surface area S1 will be less than 8%, less than 6%, or even less than 5% of the total surface area of the base surface 412B described above.

As noted above and shown in FIG. 2C, this example gate valve interface surface 410A includes an outer perimeter edge 410E (an octagon shape in FIG. 2C, but it may be other desired shapes). This outer perimeter edge 410E surrounds and defines an area S2 (also called a "total interface area" herein). In some examples of this technology, the total contacting (metal-to-metal contacting) surface area S1 between the gate valve interface surface 410A and the gate valve mount surface 310A will be less than 10% of S2 (and in some examples, the total contacting surface area S1 will be less than 8%, less than 6%, or even less than 5% of S2). Stated differently, S1 and S2 may have any one or more of the following properties: $S1<0.1\times S2$; $S1<0.08\times S2$; $S1<0.06\times S2$; and/or $S<0.05\times S2$.

FIGS. 2A-3 further illustrate that the gate valve body 410 of this example includes: (i) mounting flanges 418A (for mounting gate valve interface surface 410A to a substrate processing chamber 300) and (ii) mounting flanges 418B (for mounting gate valve interface surface 410B to a substrate handling chamber 200). While these figures show mounting flanges 418A and 418B on top and bottom areas of the gate valve body 410, other arrangements are possible (e.g., with one or more mounting flanges provided on the side surfaces of gate valve interface surface 410A and/or gate valve interface surface 410B). The mounting flanges 418A and 418B of this illustrated example include through hole openings configured to accommodate bolts 418F or other fasteners used to connect the gate valve body 410 to the substrate processing chamber 300 and the substrate handling chamber 200. At least some of the through hole openings for receiving bolts 418F or other fasteners may be oriented to pass through a raised boss surface 416A and/or 416B (or other surface that has direct metal-to-metal contact with another component). Recesses 418R between flanges 418A and flanges 418B provide access areas for gate valve 400 installation and removal, e.g., to enable the bolts 418F to be accessed, attached, and/or removed.

The structure shown in FIGS. 2A-3 includes a single surface of the gate valve (i.e., gate valve interface surface 410A) having each of the base surface 412B, the first raised ring surface 412R1, the first seal support surface 412S1, the second raised ring surface 412R2 (if present), the second seal support surface 412S2 (if present), and the raised boss surfaces 416A and 416B. Other options are possible. For example, rather than being part of the gate valve 400 (and gate valve body 410), one or more of the base surface 412B, the first raised ring surface 412R1, the first seal support surface 412S1, the second raised ring surface 412R2 (if present), the second seal support surface 412S2 (if present), and/or one or more of the raised boss surfaces 416A and 416B could be provided on the gate valve mount surface 310A of substrate processing chamber 300. In that manner, at least some of features (and optionally all of the features) providing the reduced direct-metal-to-metal contacting surface area at the substrate processing chamber 300 and gate valve 400 interface may be included as part of the substrate processing chamber 300.

In the example of the gate valve 400 discussed above in conjunction with FIGS. 2A-3, structures for providing reduced direct metal-to-metal contact surface area between the gate valve interface surface 410A and the substrate processing chamber 300's gate valve mount surface 310A are described. Additionally or alternatively, if desired, at least some or all of the same types of structures for providing reduced direct metal-to-metal contact surface area could be provided between the gate valve 400's gate valve interface surface 410B and the substrate handling chamber 200's gate valve mount surface 200A. As a more specific example, in some examples of this technology, gate valve interface surface 410B could look the same as gate valve interface surface 410A. As other examples, gate valve interface surface 410B could include one or more raised boss surfaces that look the same as raised boss surfaces 416A and/or 416B.

FIG. 2D, however, provides a perspective view of this specific example gate valve interface surface 410B. As shown in FIG. 2D, the gate valve access opening 414 of this example is enlarged at the substrate handling chamber 200 side as compared to the substrate processing chamber 300 side (note the stepped area 460 in FIG. 2D). This stepped area 460 provides additional room to accommodate the robotic arm 210 as it extends into and out of the gate valve access opening 414. Thus, in the example of FIGS. 2A-3, the opening to the gate valve access opening 414 at gate valve interface surface 410B may be at least 25% larger (in surface area defined by the perimeter of the opening) than the opening to the gate valve access opening 414 at the gate valve interface surface 410A. In some examples, the opening to the gate valve access opening 414 at gate valve interface surface 410B may be at least 30% larger (in surface area defined by the perimeter of the opening), at least 35% larger, at least 40% larger, or even at least 50% larger than the opening to the gate valve access opening 414 at the gate valve interface surface 410A.

The gate valve interface surface 410B of this example includes a raised rim 462 that surrounds the gate valve access opening 414. The raised rim 462 further includes openings 462H defined through it, e.g., for accommodating bolts 418F or other fasteners, e.g., as described above. The raised rim 462 may provide a flat, planar surface that extends around a corresponding opening 200B provided through the substrate handling chamber 200's gate valve mount surface 200A, and the raised rim 462 may directly contact the gate valve mount surface 200A. If necessary, an appropriate seal (e.g., an O-ring, a gasket, etc.) may be provided around gate valve access opening 414 and/or opening 200B to maintain a sealed condition between the gate valve 400 and substrate handling chamber 200. Thus, raised rim 462 of this example reduces the direct metal-to-metal contact surface area between the gate valve 400's gate valve interface surface 410B and the substrate handling chamber 200's gate valve mount surface 200A. The direct metal-to-metal contact surface area between the gate valve 400's gate valve interface surface 410B and the substrate handling chamber 200's gate valve mount surface 200A (the area of raised rim 462 in this illustrated example) may be less than 35% of the area defined by the outer perimeter of gate valve interface surface 410B (akin to outer perimeter edge 410E of gate valve interface surface 410A), and in some examples, less than 30%, less than 25%, or even less than 20% of the area defined by the outer perimeter of gate valve interface surface 410B.

FIG. 3 schematically illustrates a portion of a substrate processing system 100 of the type shown in FIG. 1 with a first chamber (e.g., a substrate processing chamber 300) having its gate valve mount surface 310A engaged with a first gate valve interface surface 410A of gate valve 400. The gate valve 400 has its opposite second gate valve interface surface 410B engaged with a gate valve mount surface 200A of a second chamber (e.g., a substrate handling chamber 200). The gate valve interface surfaces 410A and 410B may have any of the features described above.

As further shown in FIG. 3, in this example substrate processing system 100, a first seal 900A (e.g., an O-ring) is provided on the first seal support surface 412S1 and between the first raised ring surface 412R1 and the second raised ring surface 412R2. In this manner, the gate valve 400 is connected with the substrate processing chamber 300 in a sealed manner.

In some examples of this technology, however, a second seal 900B (e.g., an O-ring) may be provided on the second seal support surface 412S2 and between the second raised ring surface 412R2 and the base surface 412B of the first gate valve interface surface 410A. This second seal 900B, when present, can provide additional seal security between the gate valve 400 and the substrate processing chamber 300. The second seal 900B may be particularly useful, for example, for use with substrate processing chambers 300 and/or substrate processing methods that operate at very high temperatures, at very high pressures, and/or at very low (vacuum) pressures, to help maintain a secure seal.

In the examples described above and illustrated in the figures, a distinct space provides a gap or thermal break between at least 50% of the facing gate valve interface surface 410A and gate valve mount surface 310A (with only relatively small proportions of these facing surfaces in direct metal-to-metal contact). If desired, a gasket or spacer material may be provided within at least some of the volume of the space(s). The gasket or spacer material, if present, should be made from a low thermal conductive material to minimize heat transfer between the substrate processing chamber 300 and the substrate handling chamber 200 across the gate valve 400.

Reduced heat transfer from the substrate processing chamber 300 to the substrate handling chamber 200 across the gate valve(s) 400 (e.g., provided by the thermal break or spacing S) may provide several potential advantages. Reduced heat transfer across this junction may help the substrate processing chamber 300 retain heat, resulting in less heating costs and/or processing time. This advantage may be multiplied, e.g., if multiple or all gate valve 400 and substrate processing chamber 300 interfaces are structured to provide reduced direct metal-to-metal contacting surface area and reduced heat transfer (as discussed above in conjunction with FIG. 1, a cluster type substrate processing system 100 may include at least 4 (and in some instances, up to 16) gate valve 400/substrate processing chamber 300 interfaces).

Additionally or alternatively, reduced heat transfer may help keep the substrate handling chamber 200 cooler, resulting in less need for the robotic arm 210 and/or other equipment in the substrate handling chamber 200 to act as a heat sink. This may reduce or eliminate the need to circulate water and provide water cooling for the robotic arm 210 and/or substrate handling chamber 200 (thereby reducing costs, complexity, etc.). Also, reduced heat transfer from the substrate processing chamber 300 also may enable use of less expensive seals on gate valves 400 and/or gate valves 420.

Although this disclosure has been provided in the context of certain embodiments and examples, it will be understood by those skilled in the art that the disclosure extends beyond the specifically described embodiments to other alternative embodiments and/or uses of the embodiments and obvious modifications and equivalents thereof. In addition, while several variations of the embodiments of the disclosure have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure should not be limited by the particular embodiments described above.

The headings provided herein, if any, are for convenience only and do not necessarily affect the scope or meaning of the devices and methods disclosed herein.

The invention claimed is:

1. A gate valve interface surface, comprising:
   an interface surface including:
      a base surface;
      a first raised ring surface extending outward beyond the base surface, wherein the first raised ring surface extends around a gate valve access opening;
      a first seal support surface extending around the first raised ring surface;
      a first raised boss surface extending outward beyond the base surface; and
      a second raised boss surface extending outward beyond the base surface,
   wherein the interface surface defines an outer perimeter and the outer perimeter defines a total interface area, wherein the first raised ring surface, the first raised boss surface, and the second raised boss surface define at least a portion of an external component contact surface of the gate valve interface surface,
   wherein the external component contact surface is spaced outward from the base surface, and
   wherein the external component contact surface has a total contacting surface area that is less than 10% of the total interface area.

2. The gate valve interface surface according to claim 1, wherein the interface surface includes an outer perimeter edge, and wherein the first raised boss surface and the second raised boss surface are located at or proximate the outer perimeter edge.

3. The gate valve interface surface according to claim 1, wherein at least one of the first raised boss surface or the second raised boss surface defines an opening or recess configured to receive a connector for releasably connecting the interface surface with an external component.

4. The gate valve interface surface according to claim 1, wherein the external component contact surface defines a first plane and the base surface defines a second plane that is spaced from the first plane.

5. The gate valve interface surface according to claim 1, wherein the interface surface further includes a second raised ring surface extending around and defining an edge of the first seal support surface, wherein the first seal support surface extends between the first raised ring surface and the second raised ring surface.

6. The gate valve interface surface according to claim 5, wherein the interface surface further includes a second seal support surface extending around the second raised ring surface.

7. The gate valve interface surface according to claim 6, wherein the base surface defines an edge of the second seal support surface.

8. A gate valve, comprising:
a gate valve body defining a gate valve passage;
a valve component that is movable to open and close the gate valve passage; and
a first gate valve mounting face provided at a first side of the gate valve body, wherein the first gate valve mounting face includes an interface surface having:
a base surface,
a first raised ring surface extending outward beyond the base surface, wherein the first raised ring surface extends around the gate valve passage,
a first seal support surface extending around the first raised ring surface,
a first raised boss surface extending outward beyond the base surface, and
a second raised boss surface extending outward beyond the base surface,
wherein the interface surface defines an outer perimeter and the outer perimeter defines a total interface area, wherein the first raised ring surface, the first raised boss surface, and the second raised boss surface define at least a portion of an external component contact surface of the interface surface, wherein the external component contact surface is spaced outward from the base surface, and wherein the external component contact surface has a total contacting surface area that is less than 10% of the total interface area.

9. The gate valve according to claim 8, further comprising a seal in contact with the first seal support surface.

10. The gate valve according to claim 8, wherein the interface surface further includes a second raised ring surface extending around and defining an edge of the first seal support surface, wherein the first seal support surface extends between the first raised ring surface and the second raised ring surface.

11. The gate valve according to claim 10, wherein the interface surface further includes a second seal support surface extending around the second raised ring surface.

12. The gate valve according to claim 11, wherein the base surface defines an edge of the second seal support surface.

13. The gate valve according to claim 11, further comprising a first seal in contact with the first seal support surface and a second seal in contact with the second seal support surface.

14. A substrate processing system, comprising:
a first chamber having a first mount surface;
a second chamber having a second mount surface;
a gate valve having a first gate valve interface surface engaged with the first mount surface and a second gate valve interface surface engaged with the second mount surface, the gate valve further including a gate valve opening extending from the first gate valve interface surface to the second gate valve interface surface to allow substrates to move between the first chamber and the second chamber through the gate valve, wherein the first gate valve interface surface includes:
a base surface,
a first raised ring surface extending outward beyond the base surface, wherein the first raised ring surface extends around the gate valve opening,
a first seal support surface extending around the first raised ring surface,
a first raised boss surface extending outward beyond the base surface, and
a second raised boss surface extending outward beyond the base surface,
wherein the first gate valve interface surface defines an outer perimeter and the outer perimeter defines a total interface area, wherein the first raised ring surface, the first raised boss surface, and the second raised boss surface contact the first mount surface and define at least a portion of an external component contact surface of the first gate valve interface surface, wherein the base surface is spaced from the first mount surface, and wherein the external component contact surface has a total contacting surface area that is less than 10% of the total interface area; and
a first seal in contact with the first seal support surface and sealingly engaging the gate valve with the first chamber.

15. The substrate processing system according to claim 14, wherein the second chamber includes a robotic arm having a portion that extends through the gate valve opening to move substrates into and out of the first chamber through the gate valve.

16. The substrate processing system according to claim 14, wherein the first gate valve interface surface further includes a second raised ring surface extending around and defining an edge of the first seal support surface, wherein the first seal support surface extends between the first raised ring surface and the second raised ring surface.

17. The substrate processing system according to claim 16, wherein the second raised ring surface is spaced from the first mount surface.

18. The substrate processing system according to claim 16, wherein the first gate valve interface surface further includes a second seal support surface extending around the second raised ring surface.

19. The substrate processing system according to claim 18, wherein the base surface defines an edge of the second seal support surface.

20. The substrate processing system according to claim 18, further comprising a second seal in contact with the second seal support surface.

* * * * *